(12) United States Patent
Mukuge et al.

(10) Patent No.: US 11,831,811 B2
(45) Date of Patent: Nov. 28, 2023

(54) SIGNALING GATEWAY APPARATUS, PROTOCOL CONVERSION METHOD, AND PROGRAM

(71) Applicant: NEC Corporation, Tokyo (JP)

(72) Inventors: Masakazu Mukuge, Tokyo (JP); Yusei Sekitani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 236 days.

(21) Appl. No.: 17/417,945

(22) PCT Filed: Dec. 27, 2019

(86) PCT No.: PCT/JP2019/051396
§ 371 (c)(1),
(2) Date: Jun. 24, 2021

(87) PCT Pub. No.: WO2020/138412
PCT Pub. Date: Jul. 2, 2020

(65) Prior Publication Data
US 2022/0078287 A1    Mar. 10, 2022

(30) Foreign Application Priority Data

Dec. 28, 2018  (JP) ................................. 2018-246885

(51) Int. Cl.
*H04M 7/12* (2006.01)
*H04L 12/66* (2006.01)
(Continued)

(52) U.S. Cl.
CPC ............ *H04M 7/125* (2013.01); *H04L 12/66* (2013.01); *H04M 3/00* (2013.01); *H04M 7/006* (2013.01)

(58) Field of Classification Search
CPC ........ H04M 7/125; H04M 3/00; H04M 7/006; H04L 12/66; H04L 65/104
See application file for complete search history.

(56) References Cited

U.S. PATENT DOCUMENTS 7,006,433 B1 * 2/2006 Dantu ................... H04M 7/066
370/218
7,263,111 B1 * 8/2007 Davis ..................... H04L 69/16
370/522
(Continued)

FOREIGN PATENT DOCUMENTS

DE      19947073 A1 *  4/2001  ............. H04L 49/90
JP     2000022814 A      1/2000
(Continued)

OTHER PUBLICATIONS

International Search Report for PCT Application No. PCT/JP2019/051396, dated Feb. 25, 2020.
(Continued)

*Primary Examiner* — Steven Hieu D Nguyen

(57) ABSTRACT

A signaling gateway apparatus (SG) in an IP network, is directly connected to a group unit center (GC) in a PSTN in a layer of MTP level 3 without via a signaling transfer point (STP), converts a M2PA sequence number included in an XCO or an XCA which is a response to the XCO, to a sequence number with a value in a range from 0 to 127 which is a maximum value of a 7-bit unsigned integer and transmits the XCO or the XCA to an opposite apparatus.

15 Claims, 10 Drawing Sheets

(51) Int. Cl.
*H04M 3/00* (2006.01)
*H04M 7/00* (2006.01)

(56) References Cited

U.S. PATENT DOCUMENTS

| | | | | |
|---|---|---|---|---|
| 2005/0265341 A1* | 12/2005 | Benedyk | ................ | H04L 43/50 370/469 |
| 2006/0153202 A1* | 7/2006 | Dantu | .................... | H04L 69/40 370/395.52 |
| 2011/0078274 A1 | 3/2011 | Joachimpillai et al. | | |
| 2020/0186625 A1* | 6/2020 | Nakao | ................... | H04L 69/321 |

FOREIGN PATENT DOCUMENTS

| | | | |
|---|---|---|---|
| JP | 2010206448 A | 9/2010 | |
| JP | 2010279062 A | 12/2010 | |
| WO | 2018235802 A1 | 12/2018 | |

OTHER PUBLICATIONS

Nippon Telegraph and Telephone East Corp et al., "Services After Migration of Fixed-line Telephones to IP network and Migration Schedule", Oct. 17, 2017, pp. 1-16, [Searched on Dec. 7, 2018] Internet URL: https://www.ntt-east.co.jp/release/detail/pdf/20171017_01_01.pdf.

NTT Advanced Technology Corporation, Network Technology Center, "Basic NGN/IP Network Toolbox", Telecommunications Association, 2009, pp. 423-446, First Edition, ISBN:978-4-88549-043-9.

* cited by examiner

FIG. 6

| 8 | 7 | 6 | 5 | 4 | 3 | 2 | 1 | BITS |
|---|---|---|---|---|---|---|---|------|
|   |   |   |   |   |   |   |   | OCTETS |
| PRI (NOTE) * | | | UNUSED | | | | | 1 |
| SUB-SERVICE FIELD | | | | SERVICE INDICATOR | | | | 2 |
| DPC | | | | | | | | 3 |
| DPC | | | | | | | | 4 |
| OPC | | | | | | | | 5 |
| OPC | | | | | | | | 6 |
| UNUSED | | | | SLS | | | | 7 |
| UNUSED | | | | | | | | 8 |
| D | C | B | A | 0 | 0 | 0 | 1 | 9 |
| HEADING CODE H1 | | | | HEADING CODE H0 | | | | |
| FSN OF LAST RECEIVED MESSAGE | | | | | | | | 10 |
| FSN OF LAST RECEIVED MESSAGE | | | | | | | | 11 |
| FSN OF LAST RECEIVED MESSAGE | | | | | | | | 12 |

(NOTE) OPTION*

```
BIT  D  C  B  A
     0  0  1  1   CHANGEOVER ORDER SIGNAL (XCO)
     0  1  0  0   CHANGEOVER ACKNOWLEDGEMENT SIGNAL (XCA)
```

SIGNALING GATEWAY APPARATUS, PROTOCOL CONVERSION METHOD, AND PROGRAM

REFERENCE TO RELATED APPLICATION

This application is a National Stage Entry of PCT/JP2019/051396 filed on Dec. 27, 2019, which claims priority from Japanese Patent Application 2018-246885 filed on Dec. 28, 2018, the contents of all of which are incorporated herein by reference, in their entirety.

The present invention is based upon and claims the benefit of the priority of Japanese patent application No. 2018-246885, filed on Dec. 28, 2018, the disclosure of which is incorporated herein in its entirety by reference thereto.

FIELD

The present invention relates to a signaling gateway apparatus, a protocol conversion method, and a non-transitory medium storing a program.

BACKGROUND

PSTN (Public Switched Telephone Network(s)) includes a Group Unit Center (GC) that accommodates subscriber lines from a household, an enterprise and the like, and a transfer point (relay station) that relays communication from the GC within a prefecture or to outside a prefecture. For example, a subscriber exchanger is installed in the GC, and a relay exchange is installed in the transfer point. ASM (Architectural STM (Synchronous Transfer Mode) Module), which is a subscriber exchange, performs connection processing in a line-switched system, forwarding processing of packet information and so forth. Both functions of a conventional exchange apparatus and a subscriber accommodation apparatus accommodating an ISDN (Integrated Services Digital Network) subscriber can be realized with a single unit of ASM.

Migration from a PSTN to an IP (Internet Protocol) network (referred to as "PSTN migration") realizes a conventional call service on an IP network used by, for example, a fiber optic telephone (optical IP (Internet Protocol) telephone service using an optical fiber), without changing or modifying a telephone (terminal) used for a fixed line telephony (subscribed telephony using a metal cable and an INS (Information Network System) network). FIG. 1A is a diagram illustrating a configuration before PSTN migration, and FIG. 1B is a diagram illustrating a configuration after the PSTN migration. FIGS. 1A and 1B are based on "Migration from PSTN to IP Network" of Non Patent Literature (NPL) 1 (reference).

As illustrated in FIG. 1B, after migration to IP network, a relay exchange and a signal exchange in FIG. 1A are made to be IP based. A metal cable used before migration to IP network will be continuously used after migration to IP network (a subscriber exchange will be used as a metal accommodation apparatus). In addition, as illustrated in FIG. 1A, before migration to IP network, telephones are connected to the other operator by the PSTN via an interconnect exchange. As illustrated in FIG. 1B, after migration to IP network, these telephones are connected to the other operator by an IP network. A SIP server is a server that manages and controls IP telephone service using SIP (the Session Initiation Protocol).

As illustrated in FIG. 2, an ASM 101 which is a subscriber exchange in a PSTN, and an ISC (Intermediate Session Control server) 107 in an IP network are connected by "quasi-associated network connection", via an MSTP (multi-protocol signal transfer point) 102. This connection is termed as. A common channel signaling system includes "associated mode" in which signaling transfer is performed by directly connecting signaling points (Signal Points, SPs) and a "quasi-associated mode" in which signaling transfer is performed via a signaling transfer point (Signal Transfer Point, STP) without directly connecting signaling points. As in FIG. 2, connection between an ASM in a PSTN and an SG in an IP network via an MSTP is called "quasi-associated network connection".

In FIG. 2, MTP1 (Message Transfer Part level 1) of the SS7 (common channel Signaling System No. 7) protocol stack is a signaling data link part and corresponds to a physical layer, as in a first layer (layer 1) of the OSI (Open System Interconnection) reference model. MTP2 (Message Transfer Part level 2) (a signaling link function part) corresponds to a second layer (layer 2) (data link layer) of the OSI reference model and performs transmission and reception of a signaling unit (signal nit), flow control, error detection, error correction, and monitoring and initialization of a signaling link. In monitoring of a signaling link, a frequency of a reception error of a signaling unit is monitored. If the reception error occurs not less than a predetermined frequency, use of the signaling link is temporarily stopped. When the reception error frequency is dropped to a sufficiently low level, the signaling link is initialized and use thereof is resumed.

MTP3 (Message Transfer Part level 3) approximately corresponds to a third layer (layer 3) of the OSI reference model and has two functions as a signaling network function part and a signaling message processing part. The signaling network function part performs signaling traffic management (e.g., diverting signaling traffic, depending on congestion or a link failure in a SS7 signaling network), signaling link management, and signaling routing management, for example. The signaling message processing part has functions of routing, identifying, and distributing a message.

MTP4 (Message Transfer Part level 4) not illustrated may be equivalent to a seventh layer (layer 7) of the OSI reference model and correspond to an application layer. In a common channel signaling system, MTP4 corresponds to ISUP (ISDN (Integrated Services Digital Network) User Part): ISDN user part). ISUP transmits and receives signals used for connecting voice channels in the common channel.

IGS (interconnect gateway switch) is a gateway switch (exchange) to process a call, for example, between an NTT (Nippon Telegraph and Telephone Corporation) network and an NCC (New Common Carrier) network.

MSTP (Multi-Protocol Signal Transfer Point) 102 is a signaling transfer point (exchange) used to separate a call function and a signaling function equipped in a line. MSTP transmits and receives a signal needed to implement switched connection for a dedicated line. SIGCNV (Signaling Converter) 104 is a signaling conversion apparatus.

SG (Signaling Gateway) 105 is disposed at an edge in the IP network and performs bi-directional signaling conversion between signaling for SS7 and signaling for an IP networks.

M3UA (MTP3 User Adaptation) is a client/server protocol that provides a protocol IP based application (ISUP, SCCP (Signaling Connection Control Part), etc.) having an interface with the MTP3 layer, with a gateway to the SS7 network.

SCTP (Stream Control Transmission Protocol) is a transport layer protocol which was developed as a transfer protocol in conversion of SS7 to IP-based and provides various functions, such as multiple streams, data bundling and fragmentation, congestion control and flow control, and improvement of reliability based on multi-homing. Regarding IP/Eth, layer 3 (the network layer) of the OSI reference model represents the IP layer, and layer 2 (the data link layer) and layer 1 (the physical layer) represent Ethernet (registered trademark).

ISC 107 performs control to connect a VoIP (Voice over IP) network with a circuit-switched network.

Regarding transmission lines, CII/SDH designates CII line/SDH (synchronous digital hierarchy: synchronous optical fiber network), and eth designates an Ethernet transmission path.

Along with deterioration and discontinued production of an ASM, the migration from PSTN to IP network is being planned in order.

In the case of the quasi-associated network connection, there is the signaling gateway (SG) 105 that performs protocol conversion to absorb protocol difference between PSTN and IP network, as a message interconnect function. SG is disposed at an edge in the IP network and provides bi-directional conversion of signals for SS7 (common channel signaling system No. 7) and for IP network.

FIG. 2 is a diagram illustrating quasi-associated network connection between a PSTN and an IP network. As illustrated as a protocol stack in FIG. 2, in order to forward a message to a specified destination, the SG 105 performs protocol conversion after performing checking a signal up to a MTP3 layer, between points. That is, the SG 105 terminates a SS7 link, converts an MTP3 message to an M3UA message, encapsulates the M3UA message to an Ethernet frame, via a transport layer SCTP, a network layer (IP protocol) and a data link layer (Ethernet), and transmits the encapsulated Ethernet frame to the ISC 107.

Generally, a protocol is different in each apparatus depending on whether the apparatus is on a PSTN side or an IP network side. Regarding one-to-one communication, the communication is performed by MTP2 (MTP level 2) in a PSTN and by M2PA (MTP2-User Peer-to-Peer Adaptation) in an IP network (see FIG. 3).

NPL 1: Oct. 17, 2017 "Services After Migration of Fixed-line Telephones to IP network and Migration Schedule", P10, (Nippon Telegraph and Telephone East Corporation (NTT East) and Nippon Telegraph and Telephone West Corporation (NTT West)) [Searched on Dec. 7, 2018] Internet URL (https://www.ntt-east.co.jp/release/detail/pdf/20171017_01_01.pdf)

SUMMARY

When protocol conversion is performed in the quasi-associated network connection, the SG 105 in FIG. 2 needs to perform protocol conversion after terminating a link once and performing checking up to the MTP3 layer.

In the PSTN migration, to simplify processing, a policy adopted is to use "associated network connection" in which a GC (group unit center) (e.g., an ASM/SBM (subscriber module)) accommodating subscriber lines is directly connected to an SG, without via an MSTP (FIG. 2), on a route for connection between the GC and an ISC.

FIG. 3 is a diagram illustrating an example of a connection route in associated network connection after the PSTN migration. As illustrated as an example in FIG. 3, regarding MTP3 of SS7, the MTP3 protocol layer of an ASM 201 and the MTP3 protocol layer of an SG 205 are directly connected to each other to transfer a signal of an MTP3 messages. Thus, this connection is called "associated network connection". A media gateway (MG) 203 disposed between a PSTN 202 and an IP network 204 performs protocol conversion (SIGCNV) from MTP2 (layer 2) to M2PA (MTP2-User Peer-to-Peer Adaptation) in the MTP2 layer.

M2PA is an adaptation module adapted to forwarding of an SS7 MTP3 message and provides an interface and service to MTP3, as with MTP2 (Request for Comments: 4165). MTP2, and SS7 protocol stack (MTP1) lower than MTP2 are replaced by M2PA, SCTP, and IP layers. ISC 207 is the same as ISC 107 in FIG. 2

In the "associated network connection" in FIG. 3, unlike the SG (FIG. 2) in the "quasi-associated network connection", the MG 203 does not need to perform checking up to MTP3 (layer 3) when performing protocol conversion. Thus, complex software does not need to be implemented on various apparatuses.

However, in the case of the associated connection configuration in FIG. 3, a signaling network management part (signaling traffic management) of MTP3 in the ASM has a problem, for example, in that it cannot divert signaling traffic upon occurrence of a signaling link failure or the like. This problem will be described below.

FIG. 4 is a diagram illustrating signaling link changeover in the quasi-associated network connection in FIG. 2. In the quasi-associated network connection, a PSTN 103 on a path on which the ASM 101, the MSTP 102, and the SG 105 are located, is connected by a dedicated signal line (signaling link) different from a call line (call path). Regarding a common channel signaling system that is compliant with SS7, a plurality of signaling links are set in advance between opposite points or STPs (Signaling Transfer Points). Signal units are transmitted, received, and transferred, while load is being balanced by these signaling links. For example, two signaling links are prepared between SPs (signaling points), and an entire signal load is equally shared by the two signaling links. When a failure occurs on one of the two signaling links, a load is put entirely on the other signaling link.

In MTP level 2 (MTP2), for example, an error frequency rate of a received signaling unit is monitored in association with a signaling link. If the error frequency rate of a signaling link is equal to or more than a predetermined level, this signaling link is deemed to be a defective signaling link, and a signaling link changeover procedure is started. In this case, use of a defective signaling link is once stopped, and the ASM 101 transmits a changeover order (COO) message (a changeover order signal) to an opposite point via an alternative signaling link (a signaling link in a normal state). As a response to the COO message, the ASM 101 receives a changeover acknowledgement (COA) message (a changeover acknowledgement signal) from a side of the opposite point. To avoid loss of a message signaling unit (MSU) or duplicated reception thereof, the ASM 101 includes an FSN (forward sequence number) of a message definitely received in the COO for transmission to the opposite point. Use of the defective link is stopped, FSNs of unconfirmed signaling units stored in a retransmission buffer are sorted out based on a sequence number notified from a peer point, and only a signaling unit(s) that is/are unconfirmed is/are transferred via the alternative signaling link (normal signaling link). A forward sequence number (FSN) and a backward sequence number (BSN) indicate a sequence number of a signaling unit to be transmitted and are each represented by a binary code which takes a value circulating in the range from 0 to 127 (7-bit unsigned integers).

In FIG. 4, for example, when a failure occurs in a signaling link between ASM 101 and MSTP #1 102-1, a changeover of a signaling link is performed to move a signaling traffic to another signaling link. On this occasion, transmission/reception of a changeover order signal COO which indicates to execute changeover of a signaling link and transmission/reception of a changeover acknowledgement signal COA which is a response to the COO are performed, between MTP3 protocols of the relevant two points and the changeover of the signaling link is performed. That is, on occurrence of a failure on a signaling link between ASM 101 and MSTP #1 102-1 (step S1), ASM 101 stops usage of the failed signaling link and sends a changeover order signal COO via MSTP #2 102-2 to SG #2 105-2 (step S2). SG #2 105-2 returns a changeover acknowledgement signal COA via MSTP #2 to ASM 101 (step S3). ASM 101 executes changeover to another signaling link to divert a signaling traffic to the another signaling link (step S4).

FIG. 5 is a diagram illustrating a format of a changeover message (TTC (Telecommunication Technology Committee) standards JT-Q704). JT represents standards compliant with ITU-T (Telecommunication Standardization Sector) recommendations and formulated by TTC. In FIG. 5, "FSN of last received MSU" in this changeover message is 7 bits. Four bits (DCBA) of a heading code H1 are a changeover order signal: "0001" or a changeover acknowledgement signal: "0010". A DPC (destination point code) is an incoming signaling point number of the message (16 bits), and an OPC (origin point code) is an outgoing signaling point number of the message (16 bits). SLS (Signal Link Selection) is a signaling link selection number (4 bits), AB is a link set selection number, and SLC is a signaling link code.

In FIG. 3, the ASM 201 uses MTP2, and the sequence number is within the range of 7 bits (0 to 127).

If signaling link changeover is performed in the associated network configuration in FIG. 3, the SG 205 uses an extended changeover order signal (eXtended Changeover Order: XCO) of M2PA and an extended changeover acknowledgement signal (eXtended Changeover Acknowledgement: XCA) indicating a response to an XCO. 24-bit M2PA sequence number is used in XCO and XCA.

FIG. 6 is a diagram illustrating a format of a changeover message including an extended changeover order signal (JT-Q2210). The FSN of a last received message is 24 bits (a 24-bit unsigned integer). The 4 bits (DCBA) of a heading code H1 represents an extended changeover order signal (XCO): "0011" or an extended changeover acknowledgement signal (XCA): "0100". The individual information items of a DPC, OPC, and SLS are the same as those of the COO and COA.

Regarding ASM, since it does not support M2PA, signaling link changeover cannot be implemented as it is. That is, ASM uses MTP2 (layer 2), and an M2PA sequence number is 24 bits (an integer from 0 to 16,777,215).

MG (media gateway) (203 in FIG. 3) performs protocol conversion between MTP2 and M2PA, but MG does not perform renumbering of a sequence number.

As a result, in "associated network connection" in which a signaling point (ASM) in a PSTN and a signaling point (SG) in an IP network are directly connected with respect to MTP level 3 (layer 3), a signaling network management part of MTP3 in ASM cannot, for example, divert signaling traffic on occurrence of a failure on a signaling link.

The present invention has been made in view of the above problem, and an object of the present invention is to provide a signaling gateway (SG) apparatus, a protocol conversion method, and a non-transitory medium storing a program, each enabling exchange of a changeover order signal and a changeover acknowledgement signal between a group unit center (GC) that accommodates subscriber lines in a PSTN and a signaling gateway (SG) in an IP network connected to the GC by associated network connection (connected without a signaling transfer point), and enabling a signaling link changeover between the GC and the SG.

According to an aspect of the present invention, there is provided a signaling gateway apparatus, disposed in an IP (Internet protocol) network and connected by associated network connection in a layer of MTP (Message Transport Part) level 3 with a group unit center in a PSTN (Public Switched Telephone Network), the signaling gateway apparatus comprising: a sequence number conversion part that on reception of an extended changeover order signal XCO (eXtended Changeover Order) of M2PA (MTP2 User Peer-to-peer Adaptation Layer) or an extended changeover acknowledgement signal XCA (eXtended Changeover Acknowledgement) which is a response to the XCO, converts a 24-bit M2PA sequence number included in the XCO or the XCA to a value in a range from 0 to 127 which is a maximum value of a 7-bit unsigned integer; and a transmission part that transmits, to an opposite apparatus, the XCO or the XCA including the 24-bit M2PA sequence number with a value in the range from 0 to 127.

According to an aspect of the present invention, there is provided a protocol conversion method for a signaling gateway disposed in an IP (Internet Protocol) network and connected by associated network connection in a layer of MTP (Message Transport Part) level 3 with a group unit center in a PSTN (Public Switched Telephone Network), the protocol conversion method comprising:

receiving an extended changeover order signal XCO (eXtended Changeover Order) or an extended changeover acknowledgement signal XCA (eXtended Changeover Acknowledgement), which is a response to the XCO;

converting a 24-bit M2PA (MTP2 User Peer-to-peer Adaptation Layer) sequence number included in the XCO or the XCA to a value in a range from 0 to 127 which is a maximum value of a 7-bit unsigned integer; and transmitting the XCO or the XCA including the 24-bit M2PA sequence number with a value in the range from 0 to 127 to an opposite apparatus.

According to a mode of the present invention, there is provided a program, causing a computer constituting a signaling gateway disposed in an IP (Internet protocol) network and connected by associated network connection in a layer of MTP (Message Transport Part) level 3 with a group unit center in a PSTN (Public Switched Telephone Network) to perform processing comprising:

receiving an extended changeover order signal XCO (eXtended Changeover Order) or an extended changeover acknowledgement signal XCA (eXtended Changeover Acknowledgement), which is a response to the XCO;

converting a 24-bit M2PA (MTP2 User Peer-to-peer Adaptation Layer) sequence number included in the XCO or the XCA to a value in a range from 0 to 127 which is a maximum value of a 7-bit unsigned integer; and transmitting the XCO or the XCA including the 24-bit M2PA sequence number with a value in the range from 0 to 127 to an opposite apparatus.

According to an aspect of the present invention, there is provided a non-transitory medium such as a computer-readable program recording medium storing the above program such as a semiconductor storage (e.g., a RAM (Random Access Memory), a ROM (Read-Only Memory), or an EEPROM (Electrically Erasable and Programmable ROM)), an HDD (Hard Disk Drive), a CD (Compact Disc), or a DVD (Digital Versatile Disc).

The present invention enables exchange of a changeover order signal and a changeover acknowledgement signal between a GC in a PSTN and an SG in an IP network connected to the GC (associated network connection) without a signaling transfer point and enables signaling link changeover between the GC and the SG.

BRIEF DESCRIPTION OF THE DRAWINGS

FIG. 1A illustrates a configuration before the PSTN migration, and FIG. 1B illustrates a configuration after the PSTN migration.

FIG. 6 is a diagram illustrating message formats of an XCO and an XCA.

DETAILED DESCRIPTION

Example embodiments of the present invention will be described. Application of the example embodiments of the present invention to the SG (signaling gateway) 205 on the route of the associated network connection illustrated in FIG. 3 solves the problem described above which is caused by M2PA using a larger sequence number than a sequence number used by MTP2 (e.g., the problem of MTP3 of a GC (ASM) in a PSTN being unable to divert signaling traffic upon occurrence of a failure of a signaling link or the like).

Figure 1A:
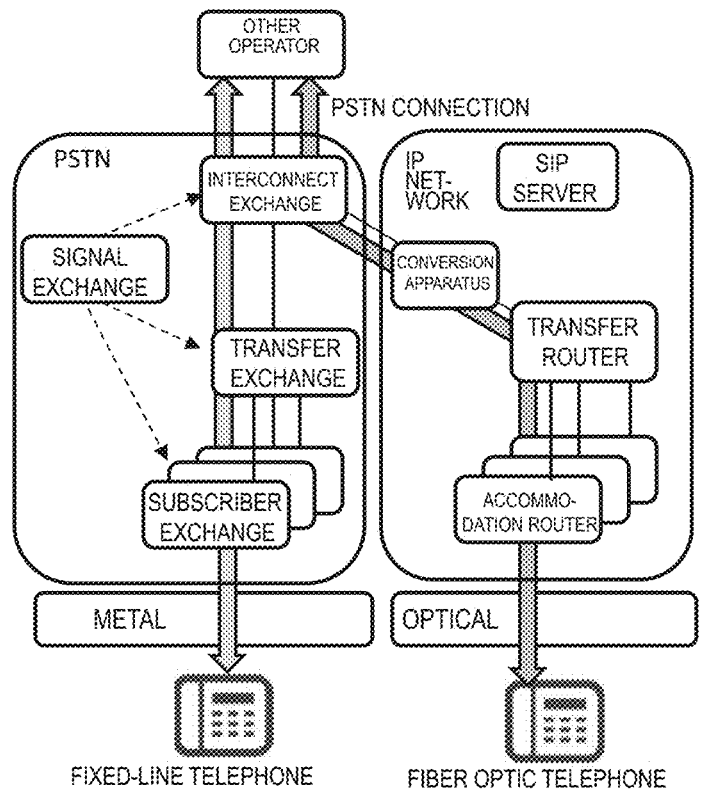
FIGS. 1A and 1B are diagrams illustrating PSTN migration, where
Figure 1B:
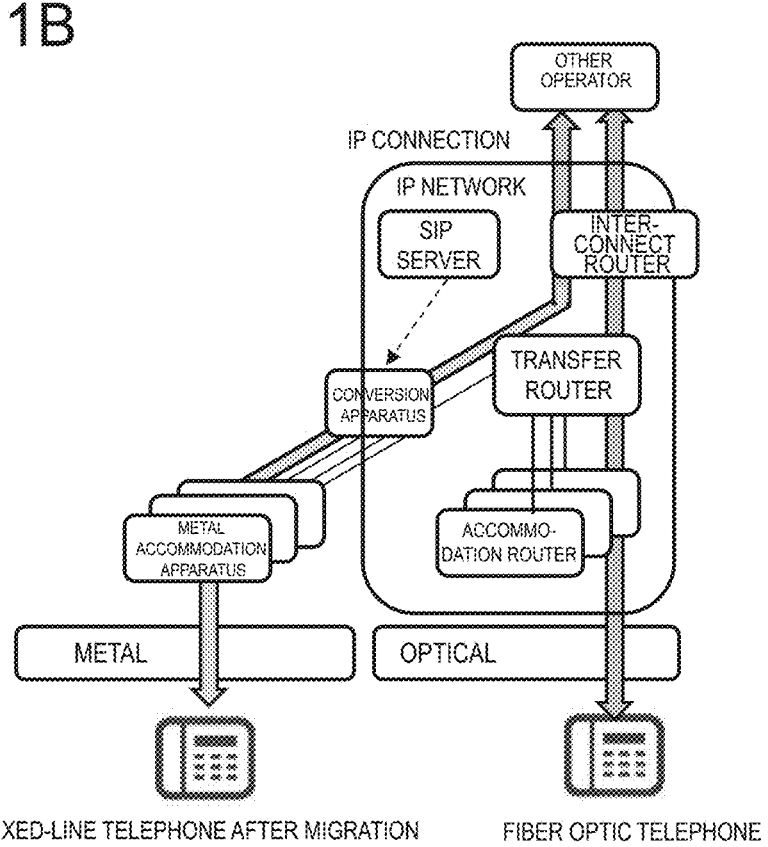
Figure 2:
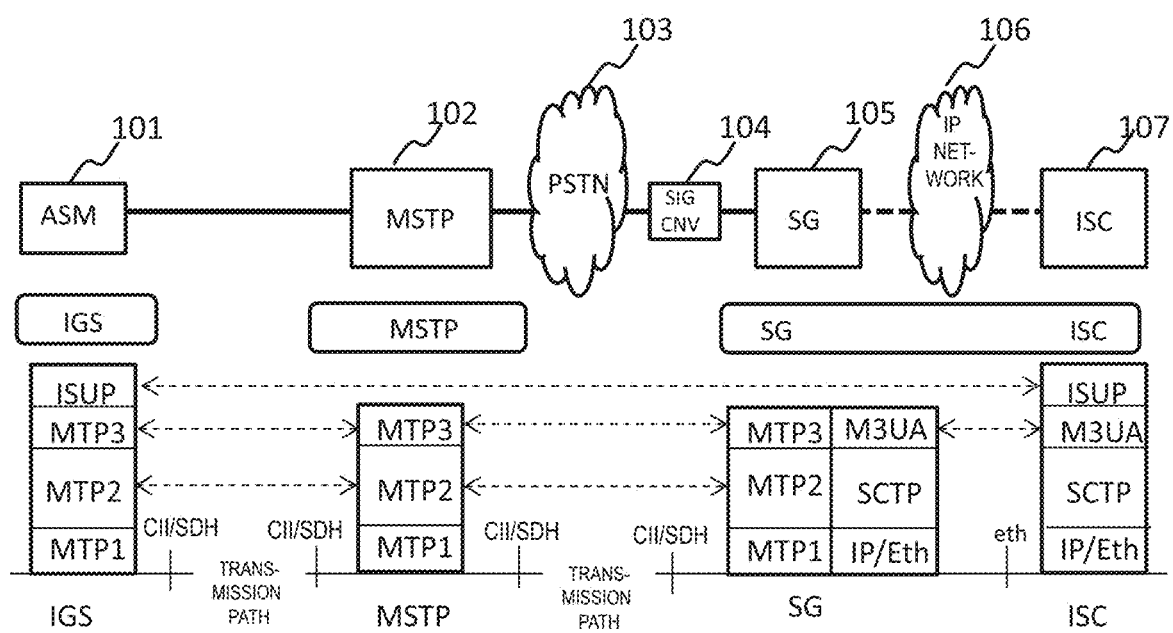
FIG. 2 is a diagram illustrating quasi-associated network connection between a PSTN and an IP network.
Figure 3:
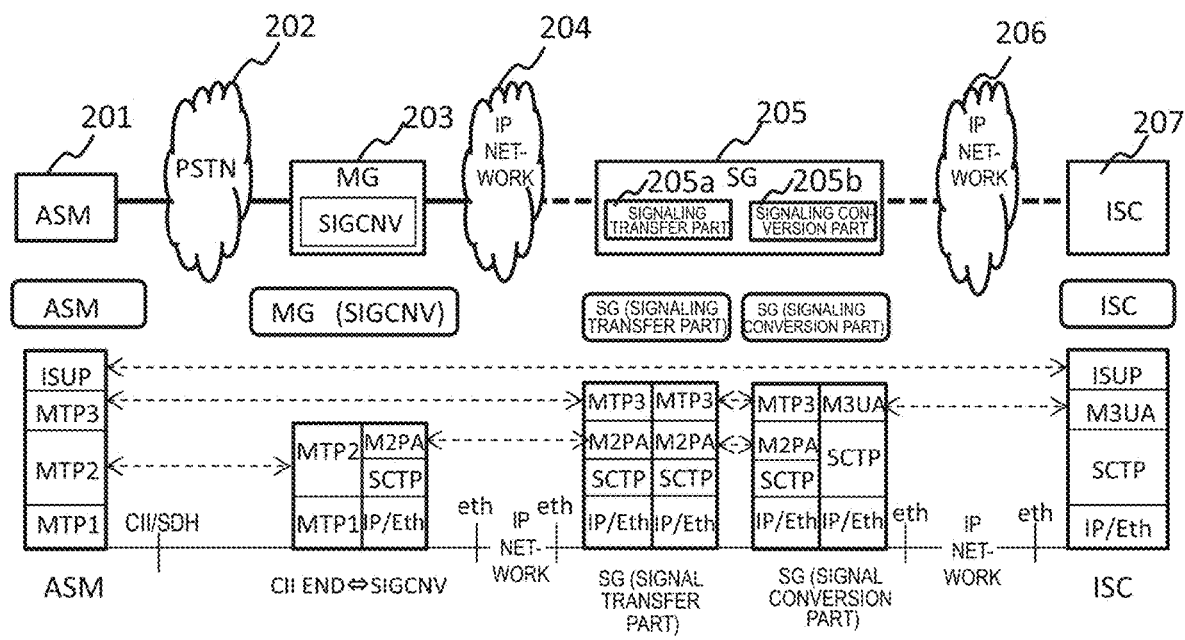
FIG. 3 is a diagram illustrating a connection route after the PSTN migration (associated network connection).
Figure 4:
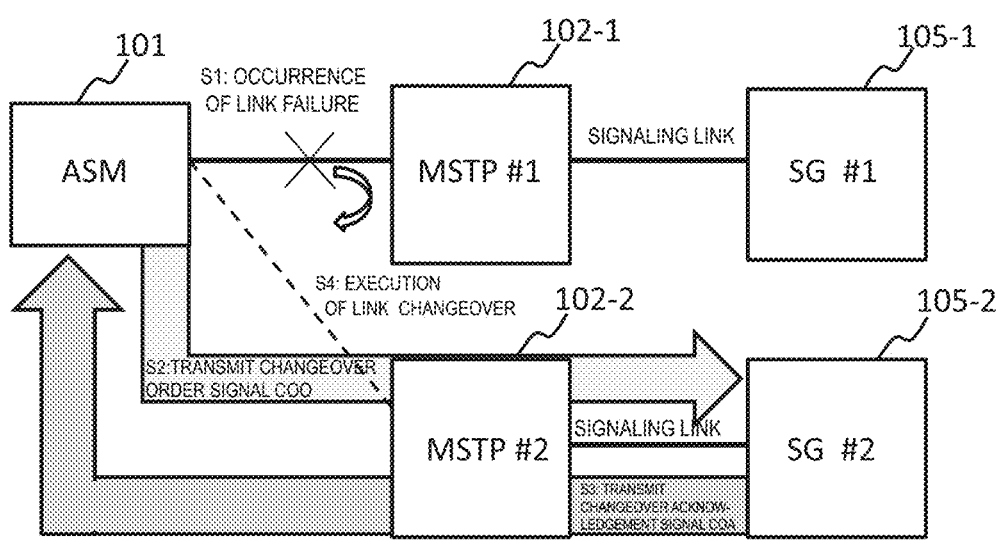
FIG. 4 is a diagram illustrating signaling link changeover (signaling link changeover between an ASM and an MSTP) in quasi-associated connection.

SG (signaling transfer part) 205a in FIG. 3 performs mutual conversion between a changeover order signal COO and an extended changeover order signal XCO and between a changeover acknowledgement signal COA and an extended changeover acknowledgement signal XCA (between a changeover message of FIG. 5 and a changeover message of FIG. 6), converts an M2PA sequence number (24 bits) to a sequence number within a range from 0 to 127 which is the maximum value of a 7-bit unsigned integer compatible with MTP2, and transmits the converted sequence number to an opposite apparatus.

Figure 7:
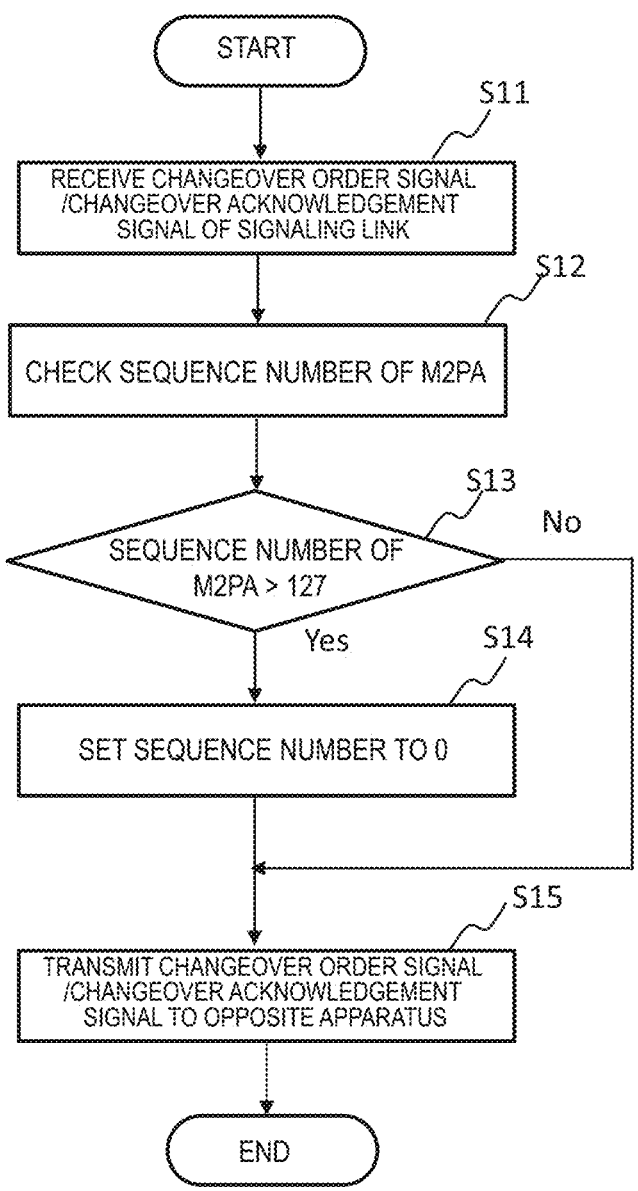
FIG. 7 is a diagram illustrating sequence number conversion processing according to an example embodiment of the present invention.

FIG. 7 is a flowchart illustrating processing (sequence number conversion processing) of the SG (signaling transfer part) 205a according to the example embodiment.

The SG (signaling transfer part) 205a receives an extended changeover order signal/changeover acknowledgement signal XCO/XCA of a signaling link (reception processing) (S11).

The SG (signaling transfer part) 205a checks an M2PA sequence number included in the received signal (sequence number conversion processing) (S12). As described above, the M2PA sequence number (24 bits) is "FSN of last received message" of 24 bits (3 octets) in the changeover message in the format in FIG. 6.

If the M2PA sequence number is 127 or less (No in S13), the SG (signaling transfer part) 205a (sequence number conversion processing) does not convert the sequence number (leaves the original value as it is).

If the M2PA sequence number is over 127 (Yes in S13), the SG (signaling transfer part) 205a (sequence number conversion processing) sets the sequence number to 0 (S14).

The SG (signaling transfer part) 205a (transmission processing) transmits the changeover order signal/changeover acknowledgement signal including the M2PA sequence number (24 bits) within the range from 0 to 127 to an opposite apparatus (S15).

Figure 8:
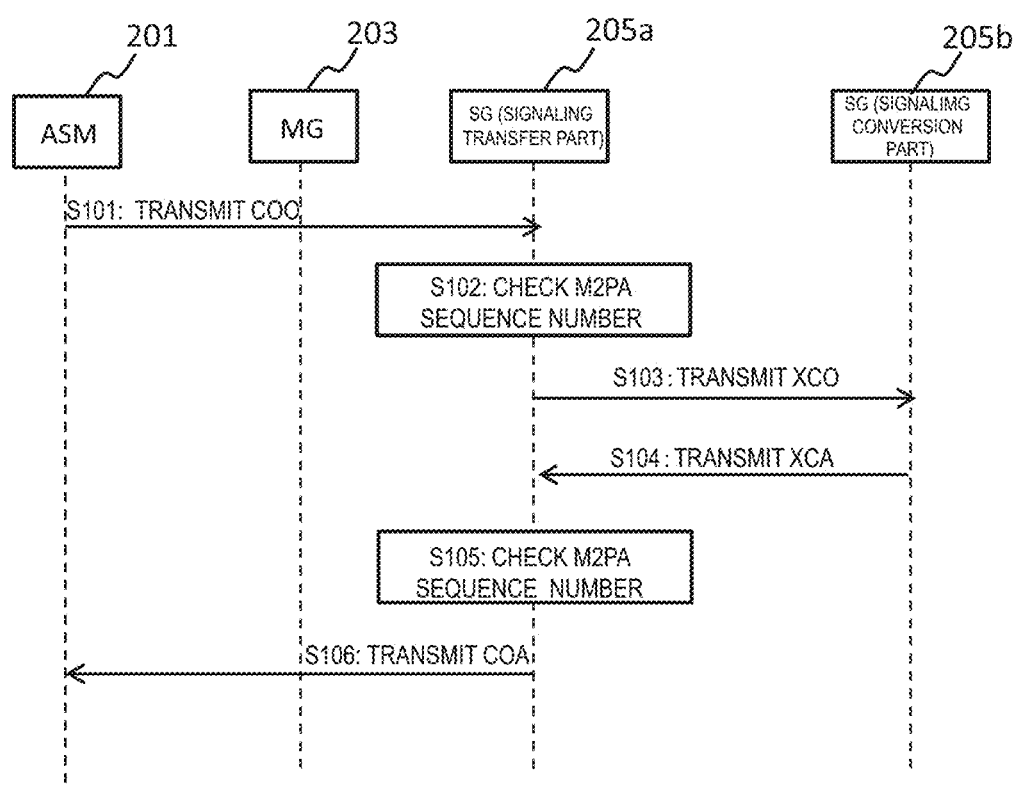
FIG. 8 is a diagram illustrating signaling link changeover sequence according to the example embodiment of the present invention.

FIG. 8 is a diagram illustrating a sequence performed when the ASM 201 starts a signaling link changeover procedure.

When the ASM 201 determines a failure of a signaling link, the ASM 201 transmits an MTP3 (layer 3) changeover order signal COO to the SG (signaling transfer part) 205a (S101).

When a changeover order signal COO, which is an MTP3 message, is generated in MTP3 (layer 3) of the ASM 201, a message routing function in MTP2 (layer 2) of the ASM 201 selects a certain signaling link through which the message COO is to be transmitted.

As illustrated in FIG. 3, with respect to MTP3 (layer 3), there is no signaling transfer apparatus between the ASM 201 and the SG 205. When transmitting the MTP3 (layer 3) changeover order signal COO in step S101, the protocol conversion in layer 2 (MTP2, M2PA) of the MG 203 (MG(SIGCNV)) converts the message COO (FIG. 5) from the ASM 201 to a message format of XCO in M2PA (FIG. 6). That is, the MG 203 converts DCBA: "0001" (FIG. 5) in the heading code H1 of the COO to DCBA: "0011" in FIG. 6 and converts the sequence number (FSN), which is a 7-bit unsigned integer, to the M2PA sequence number (24 bits). In addition, the MG 203 encapsulates the XCO message, on which protocol conversion to M2PA has been performed, into an IP packet of the IP layer (network layer) and further into an Ethernet frame via the data link layer and transmits the XCO to the SG (signaling transfer part) 205a. That is, M2PA (layer 2) of the SG (signaling transfer part) 205a receives, the COO from the ASM 201, as an XCO including a 24-bit sequence number.

When the SG (signaling transfer part) 205a receives the COO (whose format has been converted to that of the XCO of M2PA) from the ASM 201, the SG (signaling transfer part) 205a checks the 24-bit M2PA sequence number ("FSN of last received message" in FIG. 6) in M2PA (layer 2) processing (S102). At this point, since the M2PA sequence number (24 bits) corresponding to the sequence number of the COO from the ASM 201 is 127 or less, the SG (signaling transfer part) 205a transmits the received XCO to an SG (signaling conversion part) 205b as it is (S103).

The SG (signaling conversion part) 205b transmits a changeover acknowledgement signal XCA to the SG (signaling transfer part) 205a as a response to the XCO (S104).

The SG (signaling transfer part) 205a checks the 24-bit M2PA sequence number of the XCA ("FSN of last received message" in FIG. 6) (S105). If the 24-bit sequence number of the XCA is 127 or less, The SG (signaling transfer part) 205a leaves the sequence number as it is (does not perform conversion of the sequence number). If the 24-bit sequence number of the XCA is over 127, the SG (signaling transfer part) 205a sets the sequence number to 0.

Next, the SG (signaling transfer part) 205a transmits the changeover acknowledgement signal XCA including the 24-bit M2PA sequence number with a value in the range from 0 to 127, to the ASM 201 via the MG 203, as a COA of MTP3 (layer 3) (S106).

When the MG 203 receives an Ethernet frame from the SG (signaling transfer part) 205a, the MG 203 decapsulates the Ethernet frame and the IP packet and performs protocol conversion from M2PA to MTP2 in layer 2. The MG 203 (MG (SIGCNV)) converts a message format (FIG. 6) of the XCA (whose the 24-bit sequence number has been converted to the range from 0 to 127) to the COA format (FIG. 5) of MTP2. For example, the MG 203 converts DCBA: "0100" (FIG. 6) in the heading code H1 to DCBA: "0010" in FIG. 5 and converts the 24-bit sequence number (FSN) to a 7-bit sequence number (FSN). Next, the MG 203 transmits, from MTP2, MTP1, via a transmission path, to the ASM 201, the COA undergoing the protocol conversion from M2PA to MTP2.

In this way, the ASM 201 can perform a changeover of a signaling link between the ASM 201 and the SG 205 which is the opposite point of MTP3 (layer 3). In addition, a signaling network management part in MTP3 of the ASM 201 can divert signaling traffic to an alternative link upon occurrence of a failure on a signaling link between the ASM and the SG.

Figure 9:
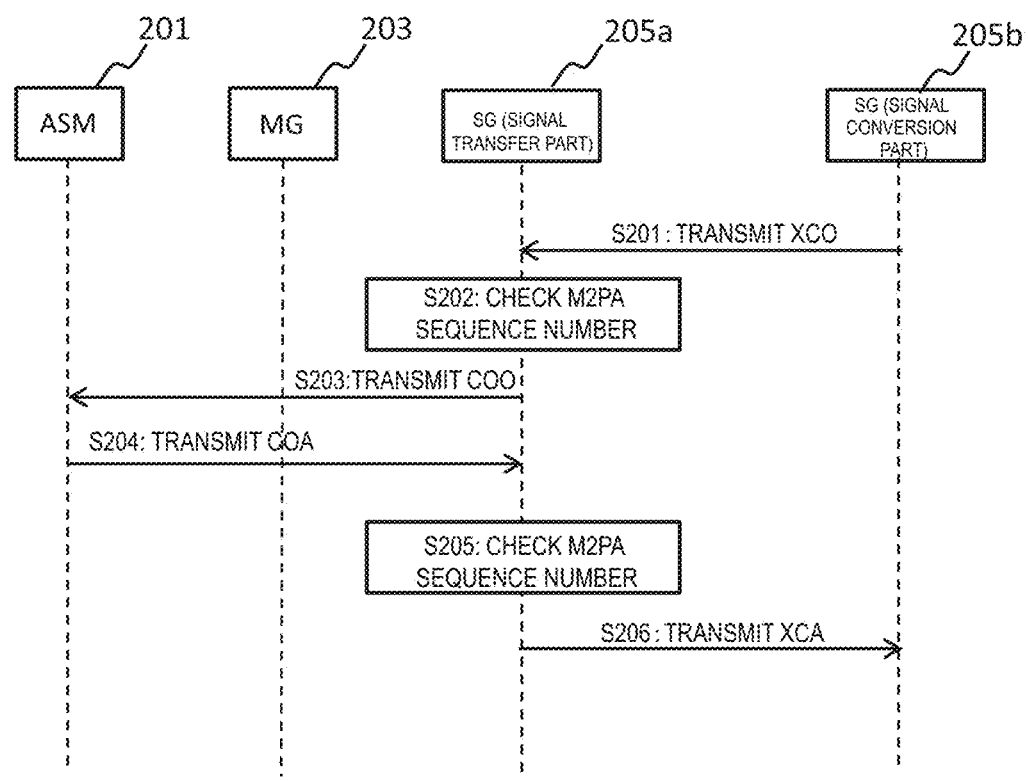
FIG. 9 is a diagram illustrating signaling link changeover sequence according to the example embodiment of the present invention.

FIG. 9 is a diagram illustrating a sequence performed when an SG starts signaling link changeover procedure.

When the SG (signaling conversion part) 205b determines a failure of a signaling link, the SG 205b transmits XCO to the SG (signaling transfer part) 205a (S201). The SG (signaling transfer part) 205a checks the M2PA sequence number of the XCO in processing M2PA (layer 2) (S202). If the sequence number is over 127, the SG 205a sets the sequence number to 0.

The SG (signaling transfer part) 205a transmits a changeover order signal including the 24-bit M2PA sequence number of the range from 0 to 127 to the ASM 201 as the changeover order COO of MTP3 (layer 3) (S203).

Figure 5:
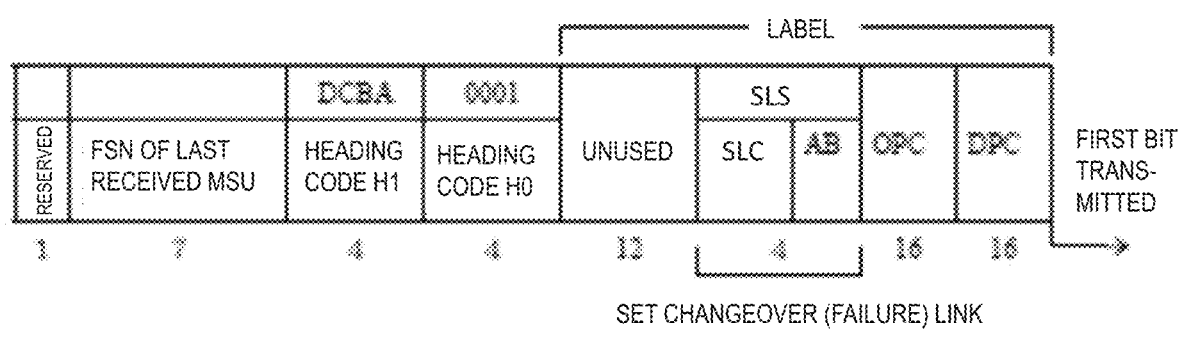
FIG. 5 is a diagram illustrating message formats of a COO and a COA.

In this step, in layer 2, when the MG 203 (MG(SIGCNV)) receives an Ethernet frame from the SG (signaling transfer part) 205a, the MG 203 decapsulates the Ethernet frame and the IP packet and performs protocol conversion from M2PA to MTP2 to convert the XCO including the M2PA sequence number (24 bits) of the range from 0 to 127 to the COO format (FIG. 5). That is, the MG 203 converts DCBA: "0011" in the heading code H1 in FIG. 6 to DCBA: "0001" in FIG. 5 and converts the 24-bit sequence number (in the range from 0 to 127) to a 7-bit sequence number. The MG 203 transmits the COO undergoing protocol conversion, from MTP2, MTP1, via transmission path, to the ASM 201.

The ASM 201 transmits COA of MTP3 to the SG (signaling transfer part) 205a (S204). On reception of the COA from the ASM 201, the MG 203 performs protocol conversion from MTP2 to M2PA in layer 2 and converts the message format (FIG. 5) of the COA to the format (FIG. 6) of the XCA of M2PA. That is, the MG 203 converts DCBA: "0010" (FIG. 5) in the heading code H1 to DCBA: "0100" in FIG. 6 and converts the 7-bit sequence number (FSN) to a 24-bit sequence number. The MG 203 encapsulates the XCA on which protocol conversion has been performed from MTP2 to M2PA into an IP packet of the IP layer and further into an Ethernet frame via the data link layer and transmits the XCA to the SG (signaling transfer part) 205a.

On reception of the XCA which has been encapsulated into an Ethernet frame, the SG (signaling transfer part) 205a checks the M2PA sequence number (S205). If the M2PA sequence number is 127 or less, the SG 205a leaves the sequence number as it is. If the M2PA sequence number is over 127, the SG 205a sets the sequence number to 0. The SG 205a encapsulates the XCA into an Ethernet frame, and transmits the Ethernet frame to the SG (signaling conversion part) 205b (S206).

Figure 10:
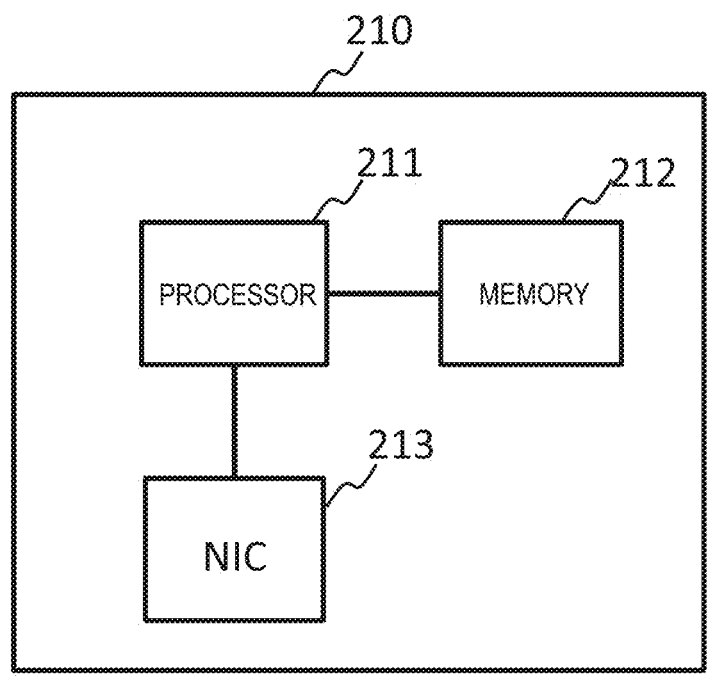
FIG. 10 is a diagram illustrating an SG according to the example embodiment of the present invention.

FIG. 10 is a diagram illustrating an example in which the functions of the SG (signaling transfer part) according to the example embodiment of the present invention are realized by causing a program to run on a computer. A computer 210 includes a processor 211, a memory 212, and a network interface card (NIC) 213. The network interface card (NIC) 213 may be an Ethernet card. In FIG. 3, the SG (signaling transfer part) is connected to the SG (signaling conversion part) via Ethernet (registered trademark) and is also connected to an IP network via Ethernet (registered trademark). The NIC 213 includes, for example, at least two Ethernet ports. The memory 212 may be a RAM, a ROM, an EEPROM, an HDD, or the like. In the memory 212, a program (a command group, data) executed by the processor 211 is stored. The processor 211 is connected to the memory 212 and reads the program to execute the program. In this way, the signaling gateway apparatus (SG) realizes processing of transferring information between a PSTN and an IP network according to the above example embodiment. That is, the signaling gateway apparatus (SG) realizes processing for receiving an XCO or XCA (S11 in FIG. 7), the sequence number conversion processing for checking the 24-bit M2PA sequence number included in the XCO or XCA and converting, if the sequence number is over 127, the sequence number to a value of the range from 0 to 127 which is the maximum value of 7-bit unsigned integers, by setting the sequence number to 0 (S12-S14 in FIG. 7), and the processing to transmit the XCO or XCA including the 24-bit M2PA sequence number with a value in the range from 0 to 127 to an opposite apparatus (S15 in FIG. 7).

The example embodiment can solve, in a network on the way to the PSTN migration, protocol inconsistency in signaling link changeover processing in a common channel signaling system, the inconsistency being caused by M2PA using a larger sequence number than a sequence number used by MTP2.

Hereinafter, abbreviations used in the description and drawings will be summarized.

ASM (Architectural STM Module): line processing module;
Eth(eth): Ethernet (registered trademark);
CII: CII line;
COA (ChangeOver Acknowledgement): changeover acknowledgement signal indicating a response to a COO;
COO (ChangeOver Order): changeover order signal;
GC (Group unit Center) located in a group unit area.
GA constituted by unit areas (UAs), each of which has a subscriber line exchanges witch, and that has a trunk line with respect to a transfer point;
IC: exchange on which a digital relay exchange (switch) is installed;
IGS (Interconnect Gateway Switch): a gateway switch that processes a call between an NTT (Nippon Telegraph and Telephone Corporation) network and an NCC (New Common Carrier) network;
ISC: Intermediate Session Control server;

ISUP (ISDN (Integrated Services Digital Network) user part): ISDN user part;

MG (Media Gateway): gateway apparatus to connect a PSTN and an IP network;

MSTP (Multi-protocol Signaling Transfer Point); signaling transfer exchange

MTP (Message Transfer Part): message transfer part;

MTP1, MTP2, MTP3: level 1 to level 3 of SS7 protocol stack, namely, signal data link part (level 1), signaling link function part (level 2), signaling network function part (level 3);

M3UA (MTP3 User Adaptation): client/server protocol providing a protocol IP based application having an interface with MTP3 layer with a gateway to an SS7 network;

PSTN (Public Switched Telephone Network): existing telephone network;

SBM (Subscriber Module): subscriber accommodation processing module;

SDH (synchronous digital hierarchy): synchronous optical fiber network;

SG (signaling gateway): gateway apparatus that performs bi-directional conversion of a call control signal between a PSTN and an IP network;

SG (signaling conversion part): a function part that converts a call control signal in an SG apparatus;

SG (signaling transfer part): a function part that performs signaling transfer in an SG apparatus;

SIP server: server that manages and controls IP telephone services using SIP (Session Initiation Protocol);

SS7: common channel signaling system No. 7;

SSC (subscriber session control server): Subscriber Call Control Server;

SCCP (Signaling Connection Control Part): signal connection control part;

SCTP (Stream Control Transmission Protocol): transport layer protocol developed as a transfer protocol (RFC 4960, etc.) for adapting SS7 to IP;

XCA (eXtended Changeover Acknowledgement): extended changeover acknowledgement signal indicating a response to an XCO; and XCO (eXtended Changeover Order): extended changeover order signal.

The disclosure of the above NPL 1 is incorporated herein by reference thereto, and the above NPL 1 may be used the basis or a part of the present invention as needed. Modifications and adjustments of the example embodiment and examples are possible within the scope of the overall disclosure (including the claims) of the present invention and based on the basic technical concept of the present invention. Various combinations and selections of various disclosed elements (including the elements in each of the claims, examples, drawings, etc.) are possible within the scope of the overall disclosure of the present invention. Namely, the present invention of course includes various variations and modifications that could be made by those skilled in the art according to the overall disclosure including the claims and the technical concept. In addition, as needed and based on the gist of the present invention, partial or entire use of the individual disclosed matters in the above literature in combination with what is disclosed in the present application should be deemed to be included in what is disclosed in the present application, as a part of the disclosure of the present invention.

What is claimed is:

1. A gateway apparatus, disposed in an IP (Internet protocol) network and connected by an associated network connection in a layer of an MTP (Message Transport Part) level 3 with a group unit center in a PSTN (Public Switched Telephone Network), the gateway apparatus comprising:
   a receiver;
   a transmitter;
   a processor; and
   a memory storing program instructions executable by the processor to perform:
   receiving, via the receiver, an extended changeover order signal XCO (eXtended Changeover Order) of M2PA (MTP level 2 User Peer-to-peer Adaptation Layer) or an extended changeover acknowledgement signal XCA (eXtended Changeover Acknowledgement) which is a response to the XCO;
   performing protocol conversion of the XCO or the XCA to a changeover order signal COO (Changeover Order) of MTP level 2 (MTP2) or a changeover acknowledgement signal COA (Changeover Acknowledgement) which is a response to the COO, the protocol conversion including:
   adjusting a content of a forward sequence number field in the XCO or the XCA to one compatible with that of the COO or the COA; and
   setting a length of the forward sequence number field in the XCO or the XCA to a length of the COO or the COA; and
   causing the transmitter to transmit, to the group unit center in the PSTN, the COO or the COA in the layer of MTP level 3.

2. The gateway apparatus according to claim 1, wherein the processor is configured to perform the protocol conversion that further includes:
   resetting, to 0, the forward sequence number field in the XCO or the XCA, when the forward sequence number field in the XCO or the XCA has a value exceeding a maximum value that the forward sequence number field in the COO or the COA is allowed to have.

3. The gateway apparatus according to claim 1, wherein the gateway apparatus is connected to the group unit center in the PSTN via a second gateway apparatus that performs protocol conversion between MTP2 and M2PA in a layer of MTP2, wherein the gateway apparatus performs mutual conversion between a format of the XCO of M2PA and a format of the COO of MTP2 and mutual conversion between a format of the XCA of M2PA and a format of the COA of MTP2.

4. The gateway apparatus according to claim 3, wherein the processor is configured to perform:
   receiving, via the receiver, the XCO or the XCA from the second gateway apparatus that performs protocol conversion on the COO or the COA of MTP2 received from the group unit center in the PSTN to obtain the XCO or the XCA of M2PA, the protocol conversion including:
   changing a heading code in the COO or the COA to a heading code of the XCO or the XCA; and
   setting a length of the forward sequence number field in the COO or the COA to a length of the XCO or the XCA; and
   causing the transmitter to transmit the XCO or the XCA to an opposite apparatus.

5. The gateway apparatus according to claim 1, wherein the group unit center in the PSTN is an ASM (architectural STM (Synchronous Transfer Mode) Module).

6. A protocol conversion method for a gateway disposed in an IP (Internet Protocol) network and connected by associated network connection in a layer of MTP (Message Transport Part) level 3 with a group unit center in a PSTN (Public Switched Telephone Network), the protocol conversion method comprising:

receiving an extended changeover order signal XCO (eXtended Changeover Order) or an extended changeover acknowledgement signal XCA (eXtended Changeover Acknowledgement), which is a response to the XCO;

performing protocol conversion of the XCO or the XCA to a changeover order signal COO (Changeover Order) of MTP level 2 (MTP2) or a changeover acknowledgement signal COA (Changeover Acknowledgement) which is a response to the COO, the protocol conversion including:

adjusting a content of a forward sequence number field in the XCO or the XCA to one compatible with that of the COO or the COA; and setting a length of the forward sequence number field in the XCO or the XCA to a length of the COO or the COA; and transmitting, to the group unit center in the PSTN, the COO or the COA in the layer of MTP level 3.

7. The protocol conversion method according to claim 6, further comprising:

resetting, to 0, the forward sequence number field in the XCO or the XCA, when the forward sequence number field in the XCO or the XCA has a value exceeding a maximum value that the forward sequence number field in the COO or the COA is allowed to have.

8. A non-transitory computer-readable medium storing a program, causing a computer constituting a gateway disposed in an IP (Internet protocol) network and connected by associated network connection in a layer of MTP (Message Transport Part) level 3 with a group unit center in a PSTN (Public Switched Telephone Network) to perform processing comprising:

receiving an extended changeover order signal XCO (eXtended Changeover Order) or an extended changeover acknowledgement signal XCA (eXtended Changeover Acknowledgement), which is a response to the XCO;

performing protocol conversion of the XCO or the XCA to a changeover order signal COO (Changeover Order) of MTP level 2 (MTP2) or a changeover acknowledgement signal COA (Changeover Acknowledgement) which is a response to the COO, the protocol conversion including:

adjusting a content of a forward sequence number field in the XCO or the XCA to one compatible with that of the COO or the COA; and setting a length of the forward sequence number field in the XCO or the XCA to a length of the COO or the COA; and transmitting, to the group unit center in the PSTN, the COO or the COA in the layer of MTP level 3.

9. The protocol conversion method according to claim 6, wherein:

the signaling gateway apparatus is connected to the group unit center in the PSTN via a second gateway apparatus that performs protocol conversion between MTP2 and M2PA in a layer of MTP level 2; and the second gateway apparatus performs mutual conversion between a format of the XCO of M2PA and a format of the COO of MTP2 and mutual conversion between a format of the XCA of M2PA and a format of the COA of MTP2.

10. The protocol conversion method according to claim 9, further comprising:

receiving, via the receiver, the XCO or the XCA from the second gateway apparatus that performs protocol conversion on the COO or the COA of MTP2 received from the group unit center in the PSTN to obtain the XCO or the XCA of M2PA, the protocol conversion including:

changing a heading code in the COO or the COA to a heading code of the XCO or the XCA; and setting a length of the forward sequence number field in the COO or the COA to a length of the XCO or the XCA; and transmitting the XCO or the XCA to an opposite apparatus.

11. The protocol conversion method according to claim 6, wherein the group unit center in the PSTN is an ASM (architectural STM (Synchronous Transfer Mode) Module).

12. The non-transitory computer-readable medium according to claim 8, wherein the program causes the computer to perform further processing comprising:

resetting, to 0, the forward sequence number field in the XCO or the XCA, when the forward sequence number field in the XCO or the XCA has a value exceeding a maximum value that the forward sequence number field in the COO or the COA is allowed to have.

13. The non-transitory computer-readable medium according to claim 8, wherein the signaling gateway apparatus is connected to the group unit center in the PSTN via a second gateway apparatus that performs protocol conversion between MTP2 and M2PA in a layer of MTP level 2, wherein the second gateway apparatus performs mutual conversion between a format of the XCO of M2PA and a format of the COO of MTP2 and mutual conversion between a format of the XCA of M2PA and a format of the COA of MTP2.

14. The non-transitory computer-readable medium according to claim 13, wherein the program causes the computer to perform further processing comprising:

receiving, via the receiver, the XCO or the XCA from the second gateway apparatus that performs protocol conversion on the COO or the COA of MTP2 received from the group unit center in the PSTN to obtain the XCO or the XCA of M2PA, the protocol conversion including:

changing a heading code in the COO or the COA to a heading code of the XCO or the XCA; and setting a length of the forward sequence number field in the COO or the COA to a length of the XCO or the XCA; and causing the transmitter to transmit the XCO or the XCA to the opposite apparatus.

15. The non-transitory computer-readable medium according to claim 8, wherein the group unit center in the PSTN is an ASM (architectural STM (Synchronous Transfer Mode) Module).

* * * * *